R. M. TILTON.
CASE MAGAZINE SOLDERING IRON.
APPLICATION FILED MAR. 13, 1917.
1,232,734.    Patented July 10, 1917.
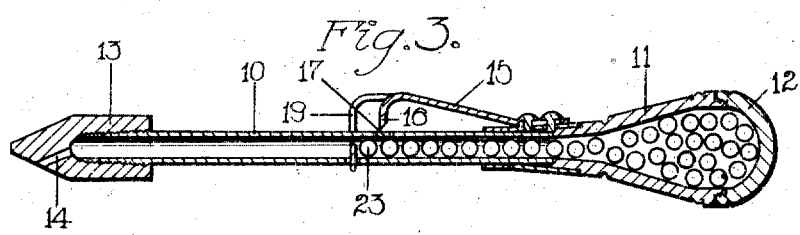
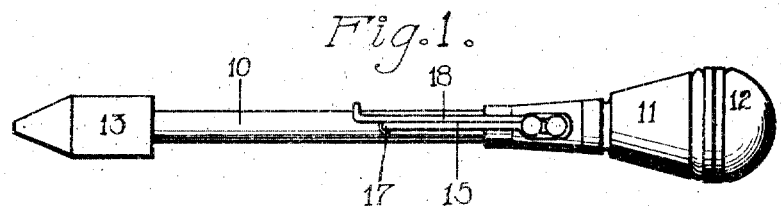
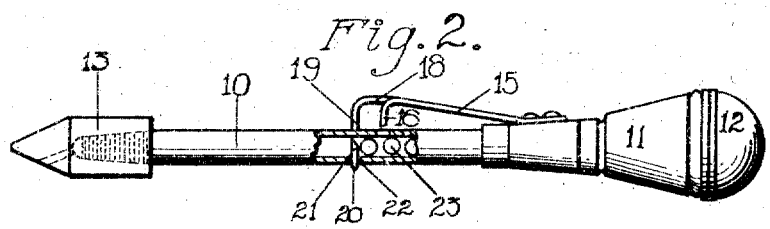

UNITED STATES PATENT OFFICE.

RAY M. TILTON, OF PANORA, IOWA.

CASE-MAGAZINE SOLDERING-IRON.

1,232,734.  Specification of Letters Patent.  Patented July 10, 1917.

Application filed March 13, 1917. Serial No. 154,641.

*To all whom it may concern:*

Be it known that I, RAY M. TILTON, a citizen of the United States, and resident of Panora, in the county of Guthrie and State of Iowa, have invented a certain new and useful Case-Magazine Soldering-Iron, of which the following is a specification.

The object of my invention is to provide a magazine soldering iron of simple, durable and inexpensive construction.

A further object is to provide a magazine soldering iron having a hollow shank connected with a handle at one end, and a soldering iron member at the other end, with means for controlling the passage of particles of solder through the shank.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a magazine soldering iron embodying my invention.

Fig. 2 shows a side elevation of the same, partly in section, and

Fig. 3 shows a vertical, central sectional view through my improved soldering iron.

In the illustration of my invention shown in the accompanying drawings, I have used the reference numeral 10 to indicate generally the shank of my improved soldering iron, which comprises a hollow tubular member having at one end a hollow handle 11, on which is detachably mounted a cover or cap 12, which may be secured on to the main body of the handle, as shown.

Mounted on the opposite end of the shank 10 is a soldering iron 13 of ordinary form into which the hollow shank 10 extends, as shown. The handle is provided with an opening to receive the end of the shank 10.

The iron 13 is provided with a passage 14 communicating with the interior of the shank 10, leading to the outer surface of the iron.

Suitably fixed at one end of the device is a spring operating member comprising an arm 15 designed to normally stand spaced above the body of the shank 10.

At its forward free end, the arm 15, has a downward extension 16 adapted to be forced inwardly through an opening 17 in the wall of the shank 10 into the interior of the shank 10 for blocking the passage therethrough.

Adjacent to the arm 15 is a small arm 18 having at its forward end a downward extension 19 spaced forwardly from the extension 16.

The extension 19 is longer than the extension 16 and extends past the shank 10.

At the lower end of the extension 16 is a laterally extending portion 20, having at one end an upwardly extending portion 21 adapted to normally extend through an opening 22 in the lower wall of the shank 10 into the interior of the shank 10 for blocking the passage therethrough. The portion 21 and the extension 16 are arranged relative to each other, with one of the portions 21 received in the shank 10. The portion 16 extends above said shank and outside said shank, as shown in Fig. 3, whereas when the arms 15 and 18, which stand side by side are pressed toward the shank 10, the extension 16 enters the shank 10 and the portion 21 leaves the shank 10.

The arms 15 and 18 are so arranged as to be rigidly engaged by the thumb of a person whose hand grasps the handle 11. The extension 16 and the portion 21 are spaced apart such a distance longitudinally of the shank 10 that between them is the proper space to receive a small pellet 23 of solder.

In the practical use of my improved soldering iron, the handle 11 and the portion of the hollow shank 10 adjacent to the said handle is filled with said pellets 23, when the cover is removed. The arm 18 normally holds the portion 21 in position so that the pellets 23 are moved past the portion 21 toward the iron 13. The cover 12 is then placed on the handle and the iron 13 is thoroughly heated, whereupon the device is ready for use. By pressing the spring arms 15 and 18 toward the shank 10 and holding the entire device in the proper position, the pellet 23, nearest the iron 13 will be permitted to roll downwardly into the iron where it will be heated and melted and will flow through the passage 14 to the exterior of the iron 13.

As soon as the pressure of the arms 15 and 18 is removed another pellet will move downwardly toward the portion 21.

My improved magazine soldering iron has a number of advantages. The portions of the solder may be fed to the iron 13 in small parts or pellets, so that only enough heat is required for melting a small pellet, and the heat is not wasted by being transmitted to a large piece of solder.

The pellet can be fed to the iron 13 without removing the iron from the metal which is being soldered, and my improved iron can be used longer without reheating than would be the case otherwise.

Some changes may be made in the construction and arrangement of the parts of my improved magazine soldering iron, without departing from its essential features and purposes, and it is my intention to cover by this application any such changes which may be included within the scope of my claims.

I claim as my invention:

1. An improved soldering iron having a hollow shank, an iron on one end thereof having an opening communicating with the interior of said shank, and having a passage leading from said opening to the exterior of said iron, a controlling device comprising a pair of spring arms each having one end fixed with relation to said shank, said arms extending away from their fixed ends and from the shank in substantially adjacent parallel position, an inward extension on one of said arms, a portion at the outer end of the other of said arms extending laterally and thence past said shank, thence laterally, and thence upwardly, said shank having openings to receive said upwardly and downwardly extending portions, said upwardly and downwardly extending portions being spaced from each other longitudinally of said shank.

2. An improved soldering iron having a hollow shank, an iron on one end thereof having an opening communicating with the interior of said shank, and having a passage leading from said opening to the exterior of said iron, a controlling device comprising a pair of spring arms each having one end fixed with relation to said shank, said arms extending away from their fixed ends and from the shank in substantially adjacent parallel position, an inward extension on one of said arms, a portion at the outer end of the other of said arms extending laterally and thence past said shank, thence laterally, and thence upwardly, said shank having openings to receive said upwardly and downwardly extending portions, said upwardly and downwardly extending portions being spaced from each other longitudinally of said shank, and a handle on said shank so arranged that the spring arms may be operated by the hand grasping said handle.

Des Moines, Iowa, February 22, 1917.

RAY M. TILTON.